United States Patent

[11] 3,613,552

[72] Inventor George W. Kean
 Woodland Drive, Granby, Conn. 06035
[21] Appl. No. 39,026
[22] Filed May 20, 1970
[45] Patented Oct. 19, 1971

[54] FOWL SLING
 5 Claims, 2 Drawing Figs.
[52] U.S. Cl. ................................................ 99/426,
 99/450, 294/27 H
[51] Int. Cl. .................................................. A47j 43/18
[50] Field of Search .......................................... 294/27, 32,
 33; 99/402, 414, 415, 418, 426, 449, 450; 220/94,
 95, 96; 224/45, 48, 50; 248/145.6

[56] References Cited
 UNITED STATES PATENTS
2,504,237 4/1950 Weissbach .................... 99/426
2,593,077 4/1952 Vogt ............................. 99/426

Primary Examiner—Evon C. Blunk
Assistant Examiner—Johnny D. Cherry
Attorney—McCormick, Paulding and Huber ABSTRACT: A sling for use in roasting fowl and the like and comprising a thin flat one-piece rectangular body having a large central opening and a pair of generally upwardly projecting arms on each side. Each arm has a hooklike formation at its upper and free end comprising a downwardly open groove. A pair of similar bails each has a generally U-shaped inverted configuration with short horizontally inwardly projecting feet and short upwardly projecting toes. The feet of the bails are disposed beneath the associated hooklike formations on the arms for easy attachment and detachment and for raising and transporting fowl or other roasts from a roasting pan.

PATENTED OCT 19 1971 3,613,552
FIG. 1
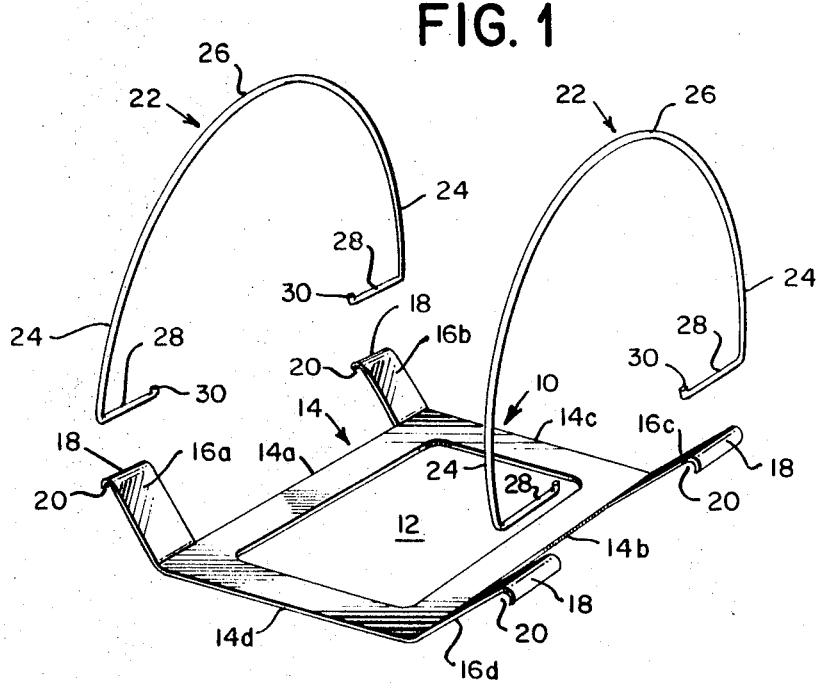
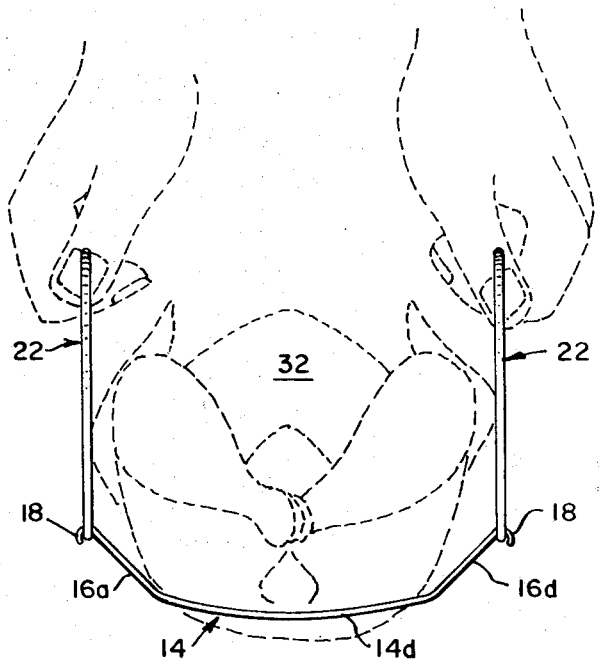
FIG. 2
INVENTOR
GEORGE W. KEAN
BY *McCormick, Paulding & Huber*
ATTORNEYS

FOWL SLING

BACKGROUND OF THE INVENTION

Various traylike devices have been provided for lifting a fowl or other roast from a roasting pan and for transporting the same. Generally, handles associated with such devices are permanently attached and tend to interfere with basting, etc. Moreover, conventional handles associated with such trays are sufficiently short to fit within the roasting pan with the top on and; in consequence, burned fingers often result from attempts to reach and manipulate the handles with a roast in the pan.

SUMMARY OF THE INVENTION

It is the general object of the present invention to provide a sling for fowl and the like which is flexible for ready conformity to the contour of the fowl thereupon, which has provision for retention of the fowl against horizontal sliding dislodgement, and which had disengageable bails or handles readily connectable in operative position and which project well above the fowl and/or the roasting pan for ease and convenience in manipulation, raising and transport of the fowl or other roast.

BRIEF DESCRIPTION OF THE DRAWING

FIG. 1 is a perspective view of the fowl sling of the present invention in exploded form.

FIG. 2 is an end view of the fowl sling of the invention with a roast disposed thereupon.

DESCRIPTION OF THE PREFERRED EMBODIMENT

Referring particularly to FIG. 1, the fowl sling of the present invention comprises a body indicated generally at 10 and which is adapted to be disposed in a roasting pan beneath a fowl or other roast. The body 10 is of unitary construction and of flexible sheetlike rectangular form in a flat horizontal attitude. There is at least one opening in the body and as shown, a rectangular opening 12 is formed centrally therein to provide a narrow flat flexible band 14 thereabout. The band 14 has elongated side portions 14a and 14b and comparatively short end portions 14c and 14d. Integrally formed at corners of the rectangular body 10 are similar arms 16, 16. Arms 16a and 16b form a first pair and are disposed at opposite end portions of the side member 14a and arms 16c and 16d of a second pair are formed similarly at opposite end portions of the band 14b.

The arms 16a–16d extend generally upwardly from the flat rectangular body and as shown, the arms extend somewhat angularly outwardly and upwardly. Each of the arms 16a–16d has a hook formation 18 at an upper and free end portion thereof. That is, the arms are bent downwardly at their upper end portions whereby to provide a downwardly open groove 20. The grooves 20, 20 are also open horizontally at each end.

As presently contemplated, the body 10 will be formed in a single stamping from sheet metal, but various other materials are envisioned within the scope of the invention.

The sling of the invention also comprises a pair of similar bails 22, 22 which are adapted for detachable connection with the body 10. The bails 22, 22 are of generally wirelike construction and take a generally inverted U-shaped configuration. Thus, it will be seen that each of the bails 22 has depending legs 24, 24 and an intermediate and upper body portion 26. The length of the legs 24, 24 is such that the body portion 26 is elevated above a roasting pan and above a fowl or other roast therein. Thus as in FIG. 2, when the body portion is gripped manually for manipulation of the bails in attaching and detaching the same and in raising and transporting a roast, there is no danger of burning the fingers of the housewife.

Referring again to the depending legs 24, 24 of the bails, it will be seen that each of said legs has a narrow horizontally extending foot 28 at a lower end portion thereof. Moreover, the feet 28, 28 extend horizontally inwardly toward each other in the preferred embodiment shown. Still further, short upwardly turned toes 30, 30 are formed integrally at inner and free ends of the feet 28, 28.

In operation of the sling, it will be apparent that the bails may be held with their feet 28, 28 beneath the downwardly open grooves 20, 20 and thereafter merely raised to bring the feet respectively into proper engagement in the grooves. The toes 30, 30 thereupon prevent horizontal sliding disengagement of the feet from their associated grooves. Thus, further manual elevation of the bails results in lifting of the body 10 and a fowl such as 32 in FIG. 2. The opening 12 within the body 10 is of such dimension as to provide for the limited downward projection of the fowl or other roast therethrough. Accordingly, horizontal sliding dislodgement of the fowl from the sling is positively avoided. Further, the flexibility of the body 10 is sufficient to accommodate bending thereof into general conformity with the contour of the fowl or other roast under the weight of the latter. This feature is best illustrated in FIG. 2 and provides additional security and retention against dislodgement of the fowl or other roast from its intended position within or upon the sling.

I claim:

1. A sling for use in roasting and transporting fowl and the like and comprising a body adapted to be disposed in a roasting pan, said body being of unitary construction and flexible sheetlike rectangular form and disposed in a flat horizontal attitude, and said body having at least one opening therein and having first and second pairs of arms extending generally upwardly therefrom, the arms of each of said pair of arms being similarly spaced apart along a side of said body and the pairs of arms being arranged on opposite sides of said body, and each said arm having at an upper and free end portion thereof a hook formation with a downwardly open groove, and a pair of similar bails of wirelike and generally inverted U-shaped configuration each having depending legs and an intermediate upper body portion adapted to be gripped manually above a fowl or the like in an associated roasting pan, said legs of said bails being adapted for detachable connection with said hook formations on said arms and each comprising a short narrow horizontally extending foot adapted to freely enter a corresponding downwardly open groove when placed therebeneath and raised by manual manipulation of the bail, said body thus being raised whereby readily to raise and to transport a fowl or other roast from a roasting pan.

2. A sling as set forth in claim 1 wherein said body comprises a narrow flat flexible band about a large central opening through which the fowl or other roast can project downwardly to prevent horizontal sliding dislodgement thereof.

3. A sling as set forth in claim 1 wherein each of said feet on each of said bails has a short upwardly projecting tow to retain the foot in the groove of its associated arm against horizontal sliding disengagement.

4. A sling as set forth in claim 3 wherein the feet on each bail project horizontally inwardly toward each other.

5. A sling as set forth in claim 4 wherein the flexibility of said body portion is sufficient to accommodate bending of the same into general conformity with the contour of the fowl or the like under the weight of the latter.